United States Patent
Barghoorn et al.

(10) Patent No.: US 12,117,090 B2
(45) Date of Patent: Oct. 15, 2024

(54) TENSIONING ASSEMBLY FOR A PROCESS VALVE

(71) Applicant: GEMÜ Gebr. Müller Apparatebau GmbH & Co. Kommanditgesellschaft, Ingelfingen (DE)

(72) Inventors: Maximilian Barghoorn, Schwäbisch Hall (DE); Johann Magej, Schwäbisch Hall (DE)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 0 days.

(21) Appl. No.: 17/858,658

(22) Filed: Jul. 6, 2022

(65) Prior Publication Data

US 2023/0078223 A1 Mar. 16, 2023

(30) Foreign Application Priority Data

Aug. 4, 2021 (DE) .................. 10 2021 120 287.6
Dec. 23, 2021 (DE) .................. 20 2021 107 033.1

(51) Int. Cl.
  *F16K 31/04* (2006.01)
  *F16K 7/12* (2006.01)
  *F16K 37/00* (2006.01)

(52) U.S. Cl.
  CPC ............ *F16K 31/047* (2013.01); *F16K 7/126* (2013.01); *F16K 37/0041* (2013.01)

(58) Field of Classification Search
  CPC ........ F16K 31/047; F16K 31/53; F16K 7/126; F16K 37/0041
  See application file for complete search history.

(56) References Cited

U.S. PATENT DOCUMENTS

| 1,992,043 | A | * | 2/1935 | Philip | ..................... F16K 7/126 |
| | | | | | 251/264 |
| 2,863,631 | A | | 12/1958 | Boteler | |
| 3,154,286 | A | * | 10/1964 | McFarland, Jr. | ....... F16K 7/126 |
| | | | | | 251/331 |
| 5,112,027 | A | | 5/1992 | Hanyu et al. | |

(Continued)

FOREIGN PATENT DOCUMENTS

DE  10 2013 107 661 A1  1/2015
DE  10 2014 221 863 A1  4/2016
(Continued)

OTHER PUBLICATIONS

Search Report of Priority Application 102021120287.6, filed Aug. 4, 2021. pp. 1-7.

(Continued)

*Primary Examiner* — Patrick C Williams
(74) *Attorney, Agent, or Firm* — BOND, SCHOENECK & KING, PLLC; George R. McGuire

(57) ABSTRACT

A tensioning assembly for a process valve is provided, including a housing having an interface for rigid connection to a valve body, a drive which is arranged so as to be fixed to the housing, a gearing supported on the housing and driven by the drive, and a tensioning element arranged on the output of the gearing, wherein the tensioning element includes a contact surface which is designed to clamp a lateral outer collar of a diaphragm of the process valve between the tensioning element and the valve body.

13 Claims, 5 Drawing Sheets

(56) References Cited

U.S. PATENT DOCUMENTS

| | | | | |
|---|---|---|---|---|
| 5,295,660 | A | * | 3/1994 | Honma ............... F16K 27/0236 |
| | | | | 251/297 |
| 5,964,446 | A | * | 10/1999 | Walton ............... G05D 16/0633 |
| | | | | 251/118 |
| 6,092,550 | A | * | 7/2000 | Gotch ....................... F16K 7/16 |
| | | | | 137/365 |
| 9,016,307 | B2 | * | 4/2015 | Matalon .................. F16K 7/126 |
| | | | | 251/248 |
| 9,709,189 | B2 | * | 7/2017 | Matalon ............... F16K 35/025 |
| 2012/0068102 | A1 | * | 3/2012 | Anagnos ............. F16K 27/0236 |
| | | | | 251/366 |
| 2016/0265676 | A1 | | 9/2016 | Stumpp |

FOREIGN PATENT DOCUMENTS

| | | |
|---|---|---|
| DE | 10 2016 108 832 A1 | 11/2017 |
| DE | 102014013512 A1 | 3/2018 |
| EP | 0399625 A1 | 11/1990 |
| GB | 2190470 A1 | 11/1987 |

OTHER PUBLICATIONS

Non English Translated Search Report, App. No. 22185399.7, dated Dec. 16, 2022, pp. 1-10.

Translated EP Office Action, Application No. 23191676.8, dated Nov. 10, 2023, pp. 1-12.

\* cited by examiner

TENSIONING ASSEMBLY FOR A PROCESS VALVE

CROSS-REFERENCE TO RELATED APPLICATION(S)

This application claims priority to German Patent Application No. 10 2021 120 287.6 filed with the German Patent Office on Aug. 4, 2021, and German Patent Application No. 20 2021 107 033.1 filed with the German Patent Office on Dec. 23, 2021, the entirety of each of which is hereby incorporated by reference.

BACKGROUND

The invention relates to advances in the field of process valves.

SUMMARY

The problems of the prior art are solved by a tensioning assembly and by a process valve.

A first aspect of the description relates to a tensioning assembly comprising a housing having an interface for rigid connection to a valve body, a gearing supported on the housing, and a tensioning element arranged on the output of the gearing, the tensioning element comprising a contact surface which is designed to clamp a lateral outer collar of a diaphragm of the process valve between the tensioning element and the valve body.

The proposed solution forms a basis for a tool-free, (semi) automated and thus improved tensioning of the diaphragm to produce the external tightness.

The tensioning of the diaphragm that takes place inside the tensioning assembly makes it possible for the design of the surfaces of the tensioning assembly and also of the process valve to be decoupled from the tensioning process. This obtained freedom of design means that the surfaces can be designed in such a way that the cleanability of the process valve is improved.

Furthermore, previous work on tensioning the diaphragm is replaced and improved as a result of this proposed solution, which not only simplifies service processes of the process valve, but allows them to be carried out more quickly.

In addition, the proposed solution results in degrees of freedom in the design of the interface to the valve body, since the diaphragm does not have to be tensioned at the same time as the tensioning assembly is arranged on the valve body.

The proposed solution also allows uniform tensioning of the diaphragm in the course of the outer collar, which means that the service life of the diaphragm can be increased.

In comparison with purely spring pre-loaded systems, defined settings of tensioning states are also possible depending on the customer or on specific requirements. The tension of the diaphragm can be adjusted to different operating pressures in this way.

An advantageous example is characterized in that the tensioning assembly converts a substantially rotational movement of the drive by means of the gearing into a translational movement of the tensioning element oriented along an adjusting axis.

The gearing allows better metering of the tension applied to the outer collar of the diaphragm, thereby avoiding tension which is excessive for the material and application of the diaphragm, and increasing the service life of the diaphragm.

An advantageous example is characterized in that the gearing is designed to be self-locking.

This means that an adjusted tension is maintained on the outer collar of the diaphragm without permanent actuation of the drive.

Due to the self-locking effect of the gearing, the diaphragm remains clamped when the drive is not actuated, which ensures safe operation of the process valve.

An advantageous example is characterized in that the tensioning assembly comprises a through-opening which extends through the tensioning assembly along the adjusting axis.

The passage through the tensioning assembly allows said assembly to be arranged between a valve drive and the valve body, with the valve rod passing through the passage.

An advantageous example is characterized in that the tensioning assembly comprises a sensor unit which is designed to provide at least one signal which characterizes a tension acting on the outer collar of the diaphragm.

The sensor unit makes it possible to provide a signal which characterizes the tension acting on the diaphragm. As a result, the tension can be adjusted or controlled with this tensioning assembly. This allows the outer collar of the diaphragm to be automatically tensioned and slackened and permanently sealed off externally. In addition, a diaphragm change and diaphragm mounting are simplified and accelerated by means of the automatic tensioning and slackening of the outer collar of the diaphragm. In a particularly advantageous manner, the use of the signal improves or allows tool-free and semi or fully automated tensioning of the diaphragm.

As a result, process valves can be cleaned, replaced or serviced at short intervals without the need for additional tools. This is particularly advantageous in the pharmaceutical and food industries.

An advantageous example is characterized in that the sensor unit comprises a sensor, the sensor being arranged so as to be fixed to the housing and the sensor providing a signal which characterizes a position of the tensioning element and thus the tension acting on the outer collar of the diaphragm.

In this way, for example, a contactless measurement can be carried out. Furthermore, this position measurement can be carried out in a cost-effective and structurally simple manner.

An advantageous example is characterized in that the tensioning assembly comprises an evaluation unit which is designed to operate the drive on the basis of the at least one signal.

The evaluation unit thus allows automated tensioning and slackening of the outer collar of the diaphragm.

An advantageous example is characterized in that the evaluation unit is designed, on the basis of the at least one signal and on the basis of a further signal, in particular a tensioning signal or a slackening signal, to actuate the drive for tensioning or slackening the outer collar of the diaphragm.

A second aspect of the description relates to a process valve comprising the tensioning assembly according to the previous aspect, the tensioning assembly being arranged between a valve drive and the valve body.

DETAILED DESCRIPTION

Figure 1:
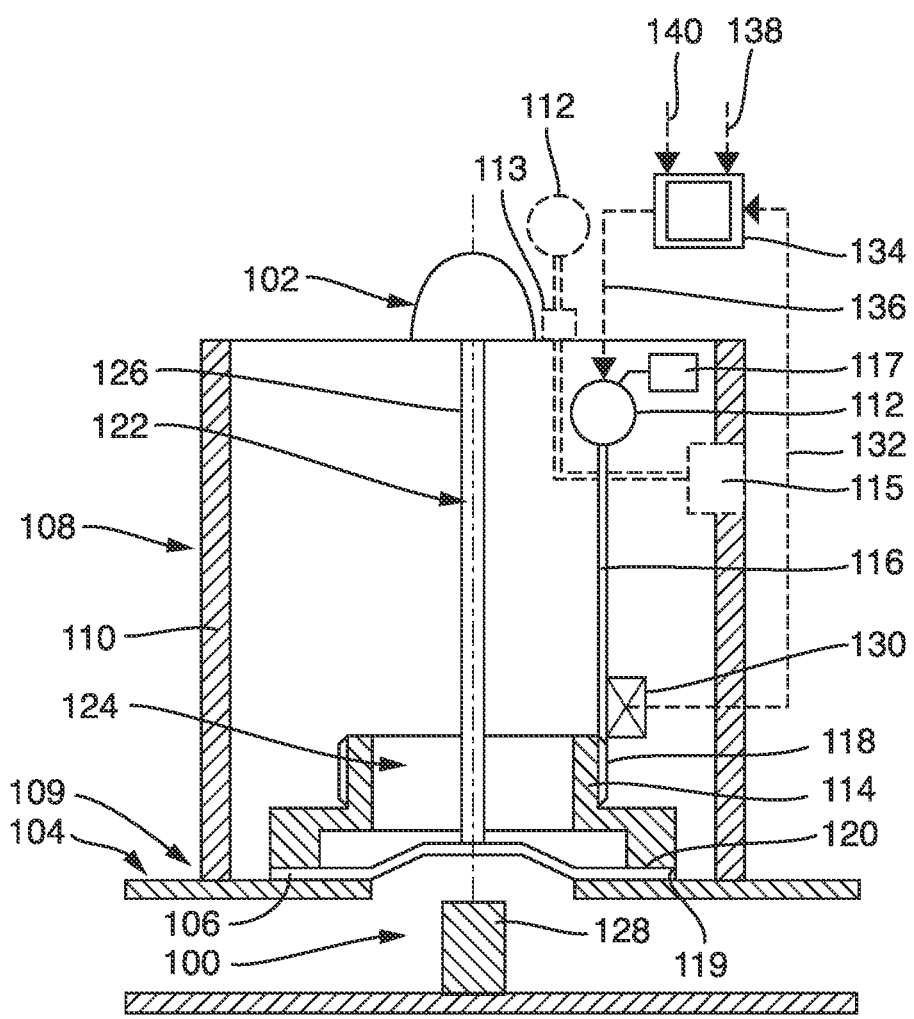
FIG. 1 schematically shows a process valve with a drive, a valve body, a diaphragm and a tensioning assembly.

FIG. 1 is a schematic sectional view of a process valve 100 with a valve drive 102, a valve body 104, a diaphragm 106 and a tensioning assembly 108. The process valve 100 shown is a diaphragm valve; however, the function of the technical measures explained in this description can easily be transferred to other types of valves, such as seat valves, in which a shut-off body and a diaphragm come apart to achieve the external tightness.

The tensioning assembly 108 comprises a housing 110 which is arranged rigidly on the valve body 104 of the process valve 100 by means of an interface 109. The interface can be achieved using mutually engaging threads, a bayonet catch or other detachable types of fastening. In addition, a drive 112 fixed to the housing 110 and a tensioning element 114 as well as a gearing 116 are arranged within the housing 110 of the tensioning assembly 108. The drive 112 is designed, for example, as an electric motor, a pneumatic drive or as a manual drive that can be operated with or without a tool. The schematically shown gearing 116 is connected to the drive 112 on the drive side and comprises a thread 118 on the output side, for example in the form of a trapezoidal thread. The gearing 116 can be designed as a strain wave gearing, a cycloidal gearing, a planetary gearing or a cylindrical gearing.

The tensioning element 114 is coupled to the drive 112 by means of the gearing 116. The tensioning element 114 applies, by means of an annular contact surface 119 facing the diaphragm 106, an adjustable tension on a lateral outer collar 120 which surrounds an inner functional region of the diaphragm 106. The gearing 116 converts a rotational movement of the drive 112 into a translational movement of the tensioning element 114 along an adjusting axis 122, as a result of which the tension on the lateral outer collar 120 of the diaphragm 106 is increased or decreased. The gearing 116 is designed to be self-locking with the tensioning element 114 in order to maintain the adjusted tension on the outer collar 120 of the diaphragm 106 without the drive 112 being actuated.

In addition, the tensioning assembly 108 comprises a through-opening 124 which extends through the tensioning assembly 108 and the tensioning element 114 along the adjusting axis 122. The through-opening 124 allows the tensioning assembly 108 to be attached between the process valve 100 and the valve drive 102, with a drive rod 126 for driving the diaphragm 106 of the process valve 100 extending through the through-opening 124. The drive rod 126 is coupled to the valve drive 102 on the valve drive side and is connected to the diaphragm 106 on the valve side. This makes it possible to open and close a fluid channel between a valve seat 128 and the diaphragm 106 by means of the valve drive 102.

In addition, the tensioning assembly 108 comprises a sensor unit 130. The sensor unit 130 comprises a sensor that generates a signal 132 which characterizes the tension acting on the outer collar 120 of the diaphragm 106 and is supplied to an evaluation unit 134. On the basis of the signal 132, the evaluation unit 134 determines an actuation signal 136 for operating the drive 112.

To tension the outer collar 120 of the diaphragm 106, the evaluation unit 134 is supplied with a tensioning signal 138 and, if necessary, a desired value or threshold value. The drive 112 is accordingly actuated by the evaluation unit 134 in order to tension the outer collar 120 of the diaphragm 106 until the signal 132 reaches the desired value or threshold value which characterizes a desired tensioning force.

To slacken the outer collar 120 of the diaphragm 106, the evaluation unit 134 is supplied with a slackening signal 140 and, if necessary, a desired value or threshold value. The drive 112 is accordingly actuated by the evaluation unit 134 in order to slacken the outer collar 120 of the diaphragm 106 until the signal 132 reaches the desired value or threshold value which characterizes no tensioning force or a reduced tensioning force.

In one example, the tensioning assembly 108 does not comprise the sensor unit 130. In this case, defined end positions of the tensioning element 114 are provided by stops arranged so as to be fixed to the housing 110. If the tensioning element 114 hits one of these end stops, the drive 112 is switched off when a motor current is exceeded.

In an example based on the previous example, the sensor unit 130 is provided. The signal 136 for actuating the drive 112 is determined on the basis of the overcurrent monitoring and on the basis of the signal 136 in order to increase operational reliability.

If the drive 112 is an electric motor, the tensioning assembly 108 comprises, in one example, an emergency power supply 117 in the form of a battery or an accumulator in order to be able to operate the drive 112 in the event of maintenance without an external power supply.

In one example, the drive 112 is located outside the tensioning assembly 108 (shown in dashed lines) rather than inside it. For this purpose, the tensioning assembly 108 comprises a gearing interface 113 for the gearing 116. The interface 113 may be located in a region of the tensioning assembly 108 that faces toward the drive 102 as shown.

Additionally or alternatively, a gearing interface 115 is arranged laterally on the housing 110 and is accessible from the outside. A manual, electric or pneumatic drive which is different from the drive 112 can be connected via the gearing interface 115, for example for maintenance purposes.

Figure 2:
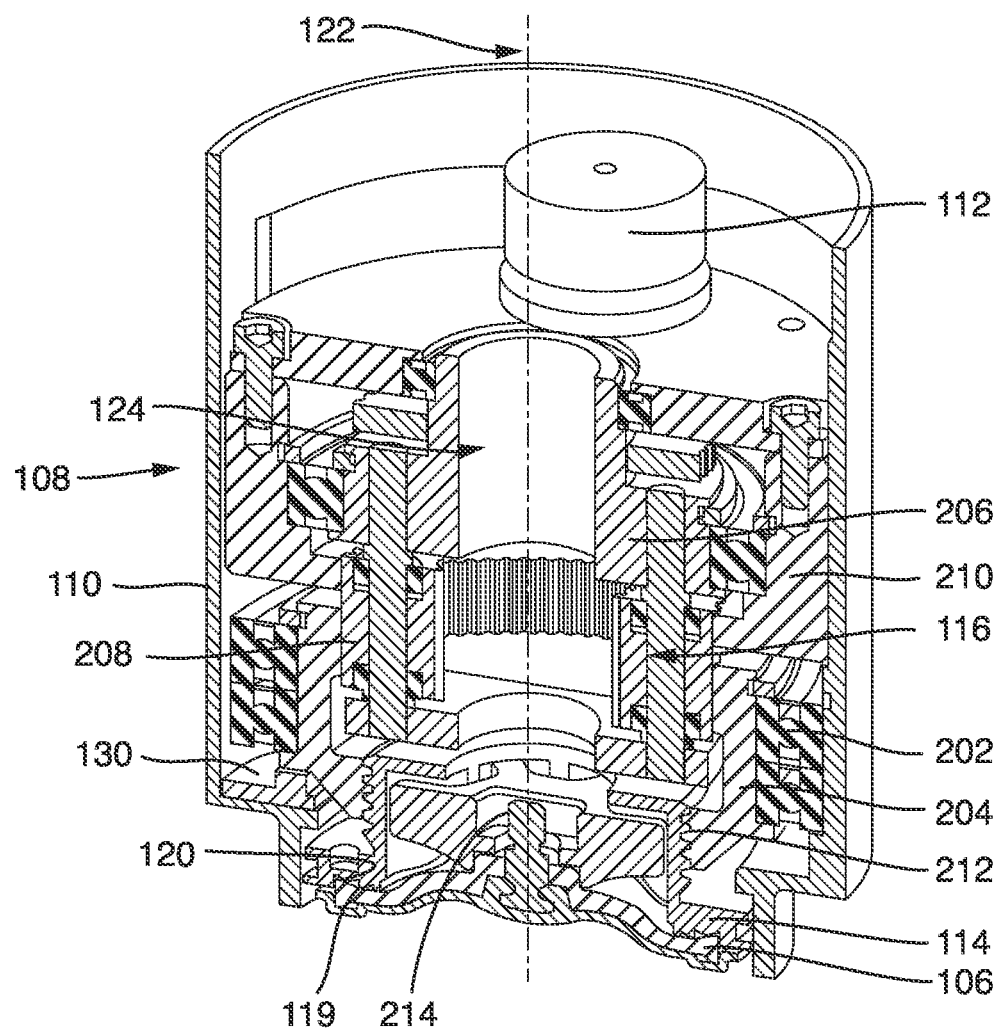
FIG. 2 shows the tensioning assembly with a tensioning element and diaphragm.

FIG. 2 shows a tensioning assembly 108 as an embodiment of the tensioning assembly 108 shown schematically in FIG. 1. The tensioning assembly 108 applies, via the tensioning element 114, an adjustable tension to the lateral outer collar 120 surrounding the inner functional region of the diaphragm 106. The tensioning assembly 108 comprises the housing 110, the drive 112, which is designed here as an electric motor, the gearing 116, and the tensioning element 114.

The drive 112 is arranged within the housing 110 so as to be fixed to said housing 110. The drive 112 is coupled to the gearing 116. The gearing 116 comprises a bearing 202 on the valve side and a ring gear 204 which is supported by the bearing 202 such that it is rotatably movable about the adjusting axis 122 in both directions of rotation. The gearing 116 is designed in the form of a planetary gearing and comprises a planet carrier 206 which is mounted such that it is rotatably movable about the adjusting axis, and planet gears 208 and a ring gear 210 that is fixed to housing 110. The drive 112 rotatably drives the planet carrier 206 and the planet gears 208 arranged thereon about the adjusting axis 122. The planet gears 208 roll on the stationary ring gear 210 and thereby cause the ring gear 204 to rotate.

For example, the number of teeth of the toothed wheels installed in the gearing 116 could be as follows: The drive 112 comprises 10 teeth; the planet carrier 206 comprises 95 teeth; the planet gears 208 comprise 28 teeth, the stationary ring gear 210 comprises 106 teeth; and the ring gear 204 comprises 104 teeth. A change in the direction of rotation of the drive 112 changes the direction of rotation of the ring gear 204 accordingly, thereby reducing or increasing the tension on the outer collar 120 of the diaphragm 106, since the tensioning element 114 moves correspondingly in a translational manner.

The tensioning element 114 presses with its contact surface 119 on the outer collar 120 of the diaphragm 106. The tensioning element 114 is mounted so as to be unable rotate about the adjusting axis 122 relative to the housing 110 by means of an interlocking connection of the tensioning element 114 with the housing 110 and is coupled to the ring gear 204 by means of an external thread 212 oriented along the adjusting axis 122, in particular a 30×2 mm trapezoidal thread, in which a corresponding internal thread of the ring gear 204 engages.

The tensioning element 114 and the housing 110 are interlockingly connected, for example, by a raised contour on the housing 110 which extends in parallel with the adjusting axis and a correspondingly designed groove in the tensioning element 114 in order to block the rotation of the tensioning element 114 about the adjusting axis 122 and allow a translation into both directions of the adjusting axis 122. The rotational movement of the ring gear 204 is converted into a translational movement of the tensioning element 114 along the adjusting axis 122 by means of the mutually engaging threads. The tension on the outer collar 120 of the diaphragm 106 is adjusted by means of this translational movement of the tensioning element 114. The thread 212 is designed to be self-locking, thereby maintaining the adjusted tension on the outer collar 120 of the diaphragm 106 without the need for further actuation of the tensioning assembly 108.

The tensioning assembly 108 comprises the through-opening 124 which extends through the tensioning assembly 108 and the tensioning element 114 along the adjusting axis 122. The through-opening 124 allows the tensioning assembly 108 to be attached between the valve drive 102 and the process valve 100, the drive rod 126 for driving the diaphragm 106 of the process valve 100 extending from the valve drive 102 through the through-opening 124 and being fastened to a receiving device 214 on the diaphragm 106.

In addition, the tensioning assembly 108 comprises the sensor unit 130, which comprises a sensor circuit board, for example, which is rigidly connected to the housing 110 and is designed for direct or indirect position measurement of the tensioning element 114. The sensor unit 130 comprises a Hall sensor or a potentiometer, for example. Other sensors having different measuring principles can be provided on the sensor circuit board.

The sensor unit 130 allows a more precise adjustment of the tension applied by the tensioning element 114 to the outer collar 120 of the diaphragm 106 by means of the position measurement. The signal 132 from FIG. 1 characterizes the aforementioned tension. Furthermore, the tensioning assembly 108 can be actuated according to the current clamped state of the diaphragm 106 using the sensor unit 130.

For example, the evaluation unit 134 is designed to increase the tension on the outer collar 120 of the diaphragm 106 by an actuation of the drive 112 and a subsequent movement of the tensioning element 114 in order to counteract a leakage.

Of course, other sensor concepts are also conceivable, such as attaching strain gauges for force measurement in particular to the tensioning element 114 or to the thread 118, in order to provide the signal 132 from FIG. 1 which characterizes the tension on the outer collar 120 of the diaphragm 106. It is also conceivable, alternatively or additionally, to attach piezoelectric elements as sensors to the thread 118 or to the surface of tensioning element 114 facing the lateral outer collar 120 or to the lateral outer collar 120 of the diaphragm 106 in order to provide the signal 132 from FIG. 1 which characterizes the tension on the outer collar 120 of the diaphragm 106. As a result, the signal 132 from FIG. 1 can be supplied to the evaluation unit 134 from FIG. 1.

Figure 3:
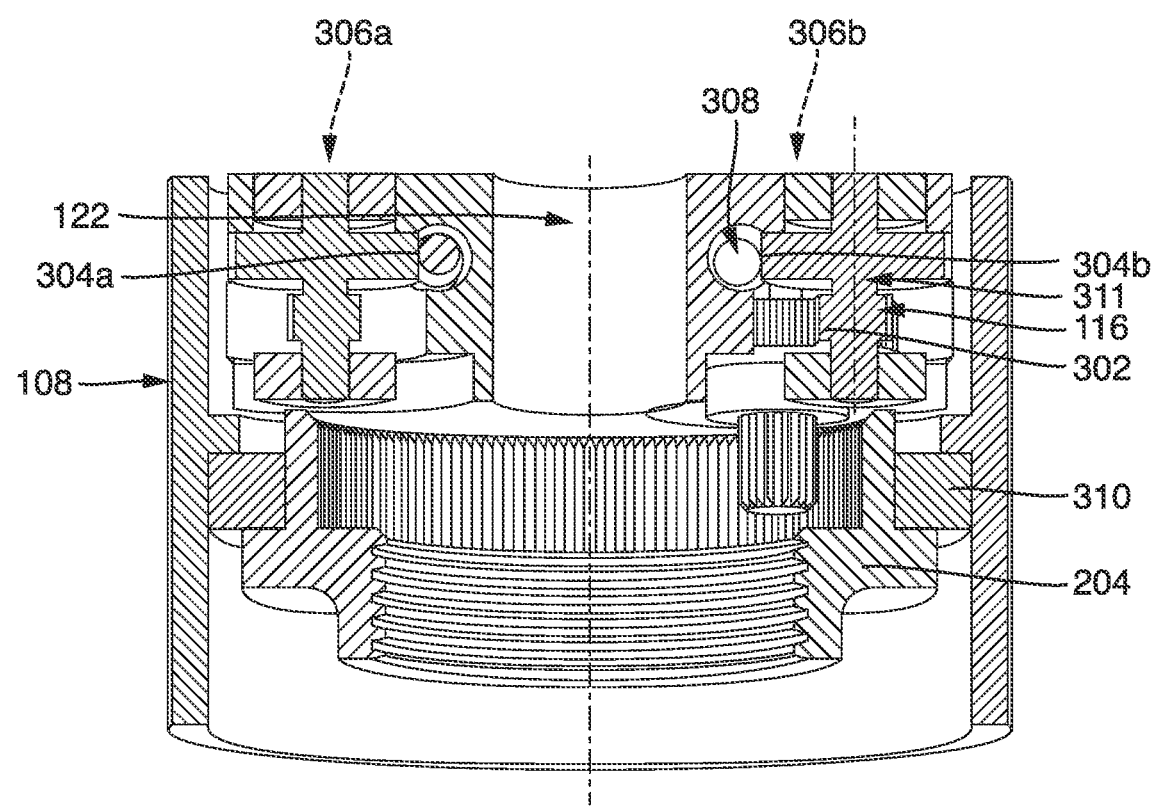
FIG. 3 shows another example of the tensioning assembly with a worm drive.

FIG. 3 shows the tensioning assembly 108 from FIG. 2 with an alternative embodiment of the gearing 116. This embodiment comprises the gearing 116 in the form of a toothed gearing, which comprises a gear pair or a plurality of gear pairs 302 and at least one worm drive 304a, 304b. Electric motors 306a, 306b (not visible in the drawing) which form the drive 112 introduce the torque thereof into the gearing 116 via the relevant worm drive 304a, 304b. The worm drive 304a is rotatably driven by the electric motor 306a about an axis 308 which extends perpendicularly to the adjusting axis 122. As a result, this rotation is transmitted to the first gear pair 302 about an axis 311 oriented in parallel with the adjusting axis 122.

In addition, the ring gear 204 of the toothed gearing is supported by a thin section bearing 310, thereby blocking the translational degree of freedom along the adjusting axis 122 and allowing the ring gear 204 to rotate in both directions of rotation about the adjusting axis 122.

Figure 4:
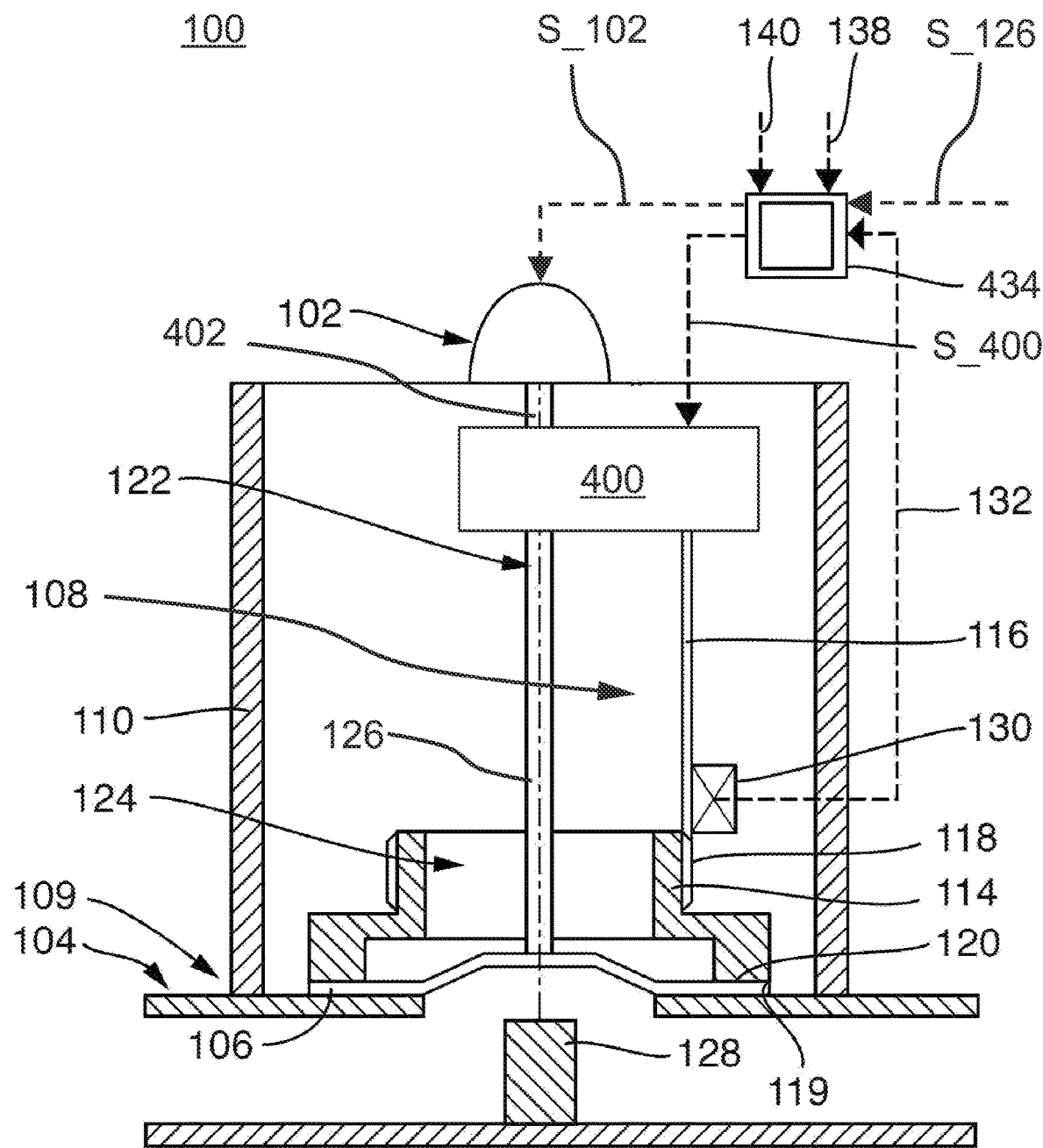
FIG. 4 schematically shows the process valve with a switchable coupling arranged between the drive, the tensioning assembly and the drive rod.
Figure 5:
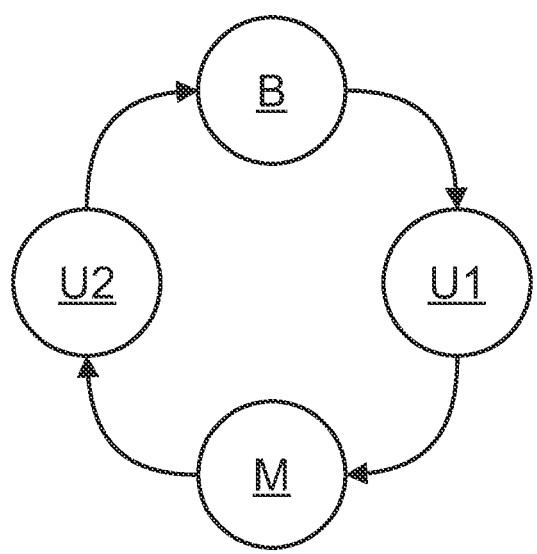
FIG. 5 shows a state transition diagram for operating the process valve according to FIG. 4.

FIG. 4 schematically shows a further embodiment of the process valve 100. In contrast to FIG. 1, there is a switchable coupling 400 between the drive 102, which for example is an electric motor, the tensioning assembly 108 and the drive rod 126. The drive 112 shown in the previous figures is omitted in this example, resulting in cost and space savings. FIG. 5 shows a state transition diagram, which is also referred to below.

The switchable coupling 400 selectively introduces a torque introduced into the coupling 400 into the drive rod 126 or into the gearing 116. A shaft 402 on the drive side is driven by the valve drive 102 and is set into a rotational movement, for example. The torque of the shaft 402 is introduced into the coupling 400.

In an operating state B, an actuation signal S_102 for the valve drive 102 is operated on the basis of a supplied adjusting signal S_126. The adjusting signal S_126 represents the desired position of the drive rod 126 and thus of the movable portion of the diaphragm 106.

In a mounting state M, the actuation signal S_102 is operated on the basis of the sensor signal 132 and on the basis of the tensioning signal 138 or the slackening signal 140.

A change from the mounting state M to the operating state B is prevented, for example, when the sensor signal 132 indicates that the lateral region of the diaphragm 106 is not sufficiently tensioned. This can be carried out, for example, by comparing the sensor signal 132 with a threshold value.

A change from the operating state B to the mounting state M is prevented, for example, when the adjusting signal S_102 indicates that the drive rod 126 is in a position in which the diaphragm 106 presses on the valve seat 128.

During the operating state B and the mounting state M, the output of the signal S_400 for switching between the two drive outputs is blocked by the evaluation unit 434. Rather, in a first transition state U1 from the operating state B to the mounting state M, the evaluation unit 434 transfers the drive rod 126 into a mounting position, in which case the shaft 402 is connected to the drive rod 126 in a force-transmitting or torque-transmitting manner and is connected to the gearing 116 in a non-force-transmitting manner. The drive rod 126 is held in the relevant position without introducing a torque from the coupling 400. After the drive rod 126 has reached the mounting position, the coupling 400 is actuated via the signal S_400 in such a way that the shaft 402 is connected in a force-transmitting manner to the gearing 116 instead of to the drive rod 122. Only then is there a change to the mounting state M in which the control signal S_102 determines the tensioning of the lateral region of the diaphragm 106.

The transition to the first transition state is started, for example, via a separate signal (not shown) at the evaluation unit 434. For example, a manually operated element can be provided on the process valve to generate this signal.

The evaluation unit 434 transfers the process valve 100 from the mounting state M to the operating state B by means of a transition state U2. In the second transition state U2, the evaluation unit 434 checks, on the basis of the sensor signal 132, whether the lateral region of the diaphragm 106 is sufficiently tensioned. If this is not the case, then a change to the operating state B is prevented. If this is the case, however, then first the coupling 400 is operated by means of the signal S_400 in such a way that the torque-transmitting connection between the drive 102 and the tensioning assembly 108 is separated and the force-transmitting connection between the drive 102 and the drive rod 126 is established and then the change to the operating state B is carried out.

What is claimed is:

1. A tensioning assembly for a process valve comprising:
   a housing having an interface for rigid connection to a valve body,
   a gearing supported on the housing, and
   a tensioning element arranged on the output of the gearing, wherein the tensioning element comprises a contact surface which is designed to clamp a lateral outer collar of a diaphragm of the process valve between the tensioning element and the valve body; and
   a drive arranged within the housing so as to be fixed to said housing, wherein the drive configured to drive the gearing is coupled to the gearing, and wherein the drive is configured to rotate relative to the housing.

2. The tensioning assembly according to claim 1, wherein a substantially rotational movement of a drive is converted by means of the gearing into a translational movement of the tensioning element oriented along an adjusting axis.

3. The tensioning assembly according to claim 1, wherein the gearing is designed to be self-locking.

4. The tensioning assembly according to claim 1, wherein the tensioning assembly comprises a through-opening which extends through the tensioning assembly along the adjusting axis.

5. The tensioning assembly according to claim 1, wherein the tensioning assembly comprises a sensor unit which is designed to provide at least one signal which characterizes a tension acting on the outer collar of the diaphragm.

6. The tensioning assembly according to claim 5, wherein the sensor unit comprises a sensor, wherein the sensor is arranged so as to be fixed to the housing, and wherein the sensor provides the at least one signal which characterizes a position of the tensioning element and thus the tension acting on the outer collar of the diaphragm.

7. The tensioning assembly according to claim 6, comprising an evaluation unit which is designed to operate the drive on the basis of the at least one signal.

8. The tensioning assembly according to claim 7, wherein the evaluation unit is designed, on the basis of the at least one signal and on the basis of a tensioning signal or a slackening signal, to actuate the drive for tensioning or slackening the outer collar of the diaphragm.

9. The tensioning assembly according to claim 1, wherein the tensioning assembly comprises a gearing interface via which a torque can be introduced into the gearing.

10. A process valve comprising a tensioning assembly that comprises a housing having an interface for rigid connection to a valve body, a gearing supported on the housing, a drive arranged within the housing so as to be fixed to said housing wherein the drive configured to drive the gearing is coupled to the gearing, and wherein the drive is configured to rotate relative to the housing, and a tensioning element arranged on the output of the gearing, wherein the tensioning element comprises a contact surface which is designed to clamp a lateral outer collar of a diaphragm of the process valve between the tensioning element and the valve body.

11. The process valve according to claim 10, wherein the tensioning assembly is arranged between a valve drive and the valve body.

12. The process valve according to claim 11, wherein a drive rod driven by the valve drive extends through the tensioning assembly and is connected to the diaphragm for the movement thereof.

13. The process valve according to claim 12, wherein a drive rod driven by the valve drive extends through the tensioning assembly and through the diaphragm and is connected to a shut-off means for the movement thereof.

* * * * *